July 22, 1969 ISAMU AMADA 3,456,539
BAND SAW
Filed Sept. 1, 1967 2 Sheets-Sheet 1
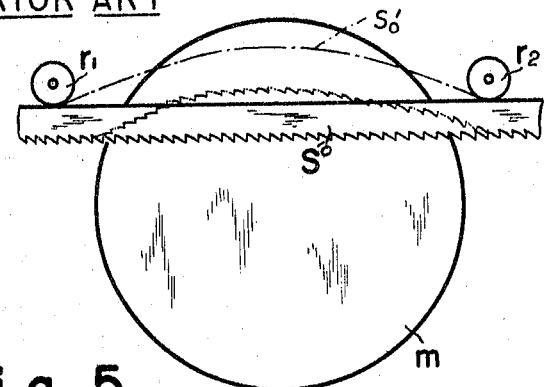
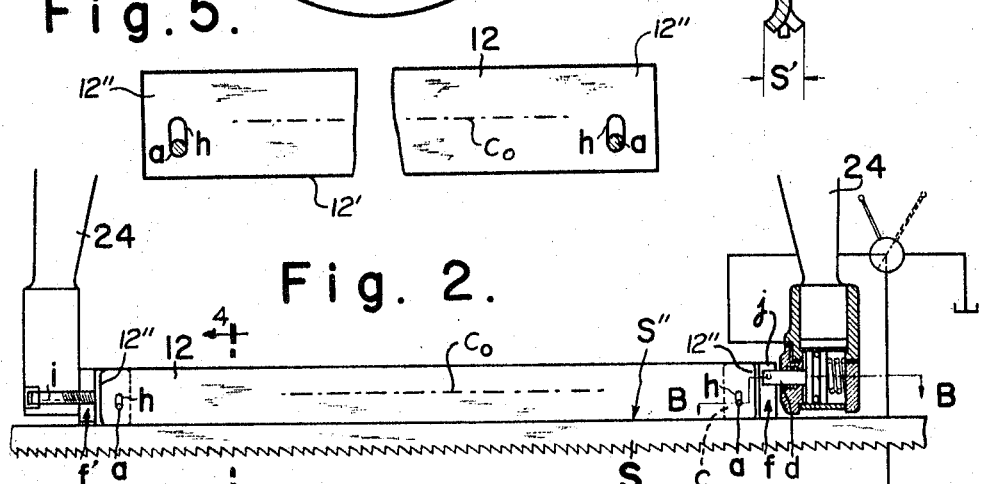
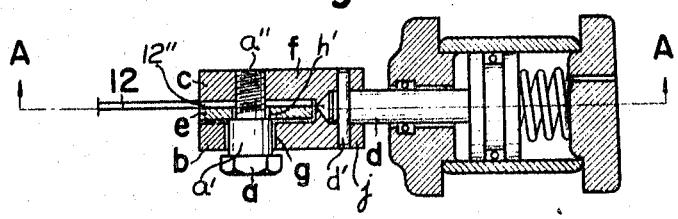
INVENTOR.
ISAMU AMADA
BY
ATTORNEY.

July 22, 1969  ISAMU AMADA  3,456,539
BAND SAW

Filed Sept. 1, 1967  2 Sheets-Sheet 2

INVENTOR
ISAMU AMADA
BY
ATTORNEY.

United States Patent Office 3,456,539
Patented July 22, 1969

3,456,539
BAND SAW
Isamu Amada, 21 Otaki-machi, Nakano-ku,
Tokyo, Japan
Continuation-in-part of application Ser. No. 473,577,
July 21, 1965. This application Sept. 1, 1967, Ser.
No. 664,971
Int. Cl. B26d 1/54, 1/00; B27b 11/02
U.S. Cl. 83—201.15                                    5 Claims

ABSTRACT OF THE DISCLOSURE

An apparatus for metal cutting comprising a band-saw for cutting a workpiece and including a saw-teeth set on one longitudinal edge and a back shoulder on the other longitudinal edge and an elongated reinforcing body longitudinally abutting the band-saw against the back shoulder of the band-saw. The band-saw and the reinforcing body are made of a strong and ductile metal, and the reinforcing body is slightly thinner than the width of the saw-teeth set. Means are provided for holding and for providing force to the reinforcing body at the ends thereof at a position between the longitudinal center of the reinforcing body and the back shoulder thereby forcing the back shoulder of the band-saw in a direction toward the saw-teeth set.

---

This application is a continuation-in-part application of Ser. No. 473,577, filed July 21, 1965, now abandoned, entitled "Band Saw."

The present invention relates to a band-saw, in general, and to a band-saw for cutting metal in particular.

The life and effective operation of conventional bandsaws is seriously curtailed, for example, by bending and twisting and breakage of the saw body and by turning of the blade out of the cutting path due to forces developed during a cutting operation as well as elongations in the upper and lower side of the blade, rather than by wear of the teeth.

It is an object of the present invention to provide a band-saw for cutting metal which eliminates the above problems and is sufficiently resistant to external forces causing bending or twisting which are developed during a sawing operation, and which band-saw has a prolonged life and an enhanced cutting efficiency and does not have any possibility for the blade to catch and break.

It is another object of the present invention to provide an improved band-saw for cutting metal which can withstand the external forces which tend to cause bending and twisting of the saw-blade and to prevent vertical and lateral swinging or oscillations of the band-saw blade so as to thereby prevent the band-saw from being caught and broken.

It is another object of the present invention to provide a metal cutting band-saw device including a band-saw and a reinforcing body disposed longitudinally slidably abutting each other with the reinforcing body above the band-saw body so as to constantly maintain a tension on the band-saw so as to force downwardly the back shoulder of the band-saw blade in the cutting operation and to cut into a workpiece, and the reinforcing body together with the saw-blade made of a strong and ductile metal, slightly thinner than the width of the saw-set teeth. The reinforcing body is held connected slightly below the center line of the reinforcing body in the proximity of the back shoulder of the saw-blade by special connectors.

With these and other objects in view which will become apparent in the following detailed description, the present invention will be clearly understood in connection with the accompanying drawings, in which:

FIGURE 1 is a diagrammatic view of an ordinary prior art band-saw being used to cut off a round bar, showing the blade turning out of desired cutting line;

FIG. 2 is an elevational view of the metal cutting band-saw and reinforcing body means, partly in section along the lines A—A of FIG. 3 through the piston and connector members for applying tension to the reinforcing body;

FIG. 3 is an enlarged section along the lines B—B of FIG. 2;

FIG. 4 is an enlarged section along the lines 4—4 of FIG. 2;

FIG. 5 is an enlarged fragmentary front elevation of the reinforcing body showing the bolts passing through the elongated slots.

Figure 6:
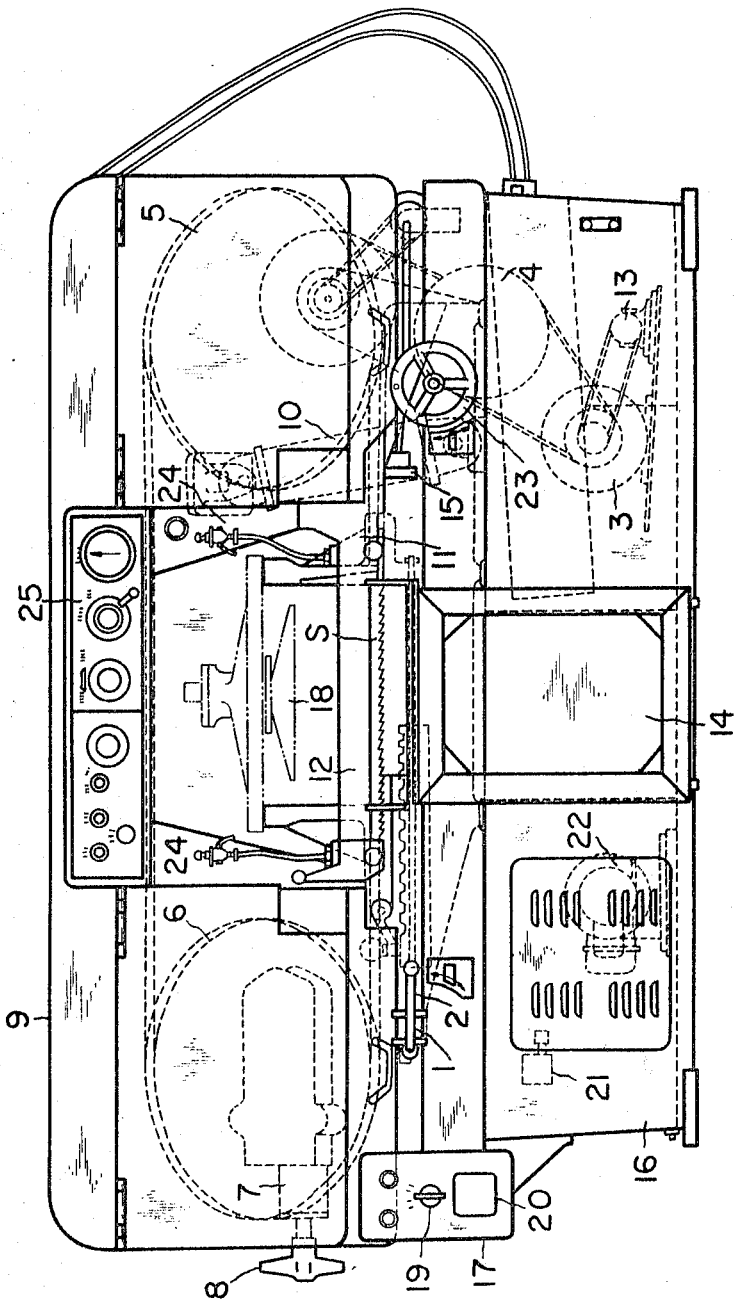
FIG. 6 is a front elevation of the entire structure of the band-saw machine utilizing the device of the present invention.

Referring now to the drawings, and more particularly to FIG. 1, ordinary conventional band-saws $S_0$ are usually formed of relatively thin blades of tool steel with extremely limited widths because they have to stand external forces, such as bending, and sometimes additional twisting forces. As a consequence, the blades tend to leave a workpiece $m$ during a sawing operation, between the rollers $r_1$ and $r_2$, as illustrated in FIG. 1 in dashed lines $S_0'$. Such removal of the blade from the workpiece in turn can produce vibrations throughout the saw with the result that the teeth can catch and break, thereby seriously effecting the cutting efficiency and service life of the saw. The back shoulder of the band-saw body tends to move upwardly between the positions $r_1$ and $r_2$ of the right and left final holders or fixtures in the form of rollers which hold the saw-blade $S_0$. This movement causes the entire band-saw to oscillate so that the band may be caught by the work to be cut and the saw-blade broken. Consequently, the efficiency in the cutting operation is severely reduced and the service life of the band-saw is shortened.

Referring to the drawings, and more particularly to FIG. 6, a metal sawing machine incorporating the metal band-saw device of the present invention is illustrated, comprising a front vice cylinder 1 for holding tightly in position a work to be cut, a control lever 2 for the front vice cylinder 1 and an endless band-saw S, for cutting the work. The band-saw S is mounted about a driving wheel 5 and a driven wheel 6, by which the band-saw S is rotated and moved. A driving motor 3 and a speed change gear 4 are provided for the driving wheel 5. A saw-blade tension cylinder 7 is provided with a tension cylinder hand-wheel 8 thereon. The machine includes a housing yoke 9 and a swing cylinder 10, and further contains a blade guide 11 for guiding the saw-blade S and a reinforcing member 12 in accordance with the present invention backing up the saw-blade S. A pump 13 is provided for feeding cutting oil from a cutting oil tank 14, a wire brush 15 is disposed in the path of the saw-blade teeth and a hydraulic oil tank 16 is provided. A switch box 17 is disposed on the unit, and a multi-cutting device 18, a selection switch 19 for multiple cutting and a counter 20 are provided. An adjusting valve 21 for adjusting the vice cylinder 1 and a hydraulic pump 22 including a hand-wheel 23 for adjusting the speed of the band-saw are also provided. A panel 25 indicates various conditions of the device and controls.

The rotary motion of the driving wheel 5 is produced by the driving motor 3 through the speed change gear 4. The endless saw-blade S runs about the driving wheel 5 and the driven wheel 6. Between the wheels 5 and 6, the saw-blade S is placed under tension by the saw-blade tension cylinder 7 which is operated by oil pressure. Further tension to the saw-blade is supplemented by the handle 8. Consequently the saw-blade is securely held between the driving wheel 5 and the driven wheel 6, and at the same time it is run by the rotation of the driving wheel 5. The housing yoke 9 on which the driving wheel 5 and the driven wheel 6 are mounted is pivotally connected at its lower right end with the upper end of the main body of the saw machine by means of a pin (not shown), and by applying oil pressure to the swing cylinder 10, the housing yoke 9 swings up around the pin.

After the housing yoke is swung upwardly, the work to be cut is held tightly between the fixed vice and the movable vice which is operated by the front vice cylinder 1. Then the housing yoke 9 is moved down until it lies on the main body of the saw machine as the operating oil within the swing cylinder 10 is gradually returned back to the hydraulic tank 16, so that the work to be cut can be cut by the saw-blade S.

The running speed of the saw-blade S is regulated variably by the hand-wheel 23. The cutting oil pump 13 is driven by the driving motor 3.

In the band-saw machine of the type described, the apparatus according to the present invention is disposed at the back shoulder S″ of the band-saw blade S in the cutting operation which is run by means of the driving wheel 5 and the driven wheel 6.

The reinforcing body 12 of the present invention is made of metal, such as steel, or the like, and is disposed longitudinally against the back shoulder S″ of the endless band-saw blade S (FIG. 2), and in the cutting operation, the saw-blade S moves across the abutting bottom 12′ of the reinforcing body 12.

Referring now again to the drawings, and more particularly to FIGS. 2 and 3, right end 12″ of the reinforcing body 12 is operatively connected through connector $f$ to a piston mechanism $d$ disposed in right bracket member or leg portion 24 provided integrally at the right end of the supporting frame for the meters mounted on the housing yoke 9 (FIG. 6). The connector $f$ comprises spaced bifurcated fixed elements $b$ and $c$, between which is disposed right end 12″ of the reinforcing body 12. Between element $b$ and the end 12″ of the reinforcing body 12 is a laterally moving element $e$, and a bolt $a$ connects the reinforcing body 12 therewith. The bifurcated elements $b$ and $c$ meet in a common end $j$ of the connector $f$, which common end $j$ is connected to the piston mechanism $d$ by a pin $d′$ passing through the piston mechanism $d$ and the common end $j$ of the connector $f$ in which common end $j$ the piston mechanism $d$ is positioned. The bolt $a$ has an enlarged portion $a′$ which passes through a substantially complementary enlarged bore $g$ in the fixed element $b$ and which abuts the moving element $e$ which is formed with a smaller bore $h′$, therefor, and through which bore $h′$ a smaller screw-threaded portion $a″$ of the bolt $a$ extends, further passing through a vertically elongated bore $h$ formed in the end 12″ of the reinforcing body 12, which threaded screw portion $a″$ is threadedly engaged in a threaded opening in the bifurcated element $c$.

The vertically elongated slots $h$ are formed in both ends 12″ of the reinforcing body 12 and are located slightly below the longitudinal center $c_0$ of the reinforcing body, and the slots $h$ are coaxially aligned with the round bores $g$ in the fixed element $b$. The bolt $a$ is laterally movable along its axis and is tightened so that the moving element $e$ is pressed by the enlarged portion $a′$ of the bolt $a$ toward the fixed element $c$, so that the end 12″ of the reinforcing body 12 is positively and securely fixed tightly in position between and against the moving element $e$ and the fixed element $c$.

The left end 12″ of the reinforcing body 12 is fixed similarly to the left leg portion 24 of the housing by means of another similar bolt $a$, and another connector $f′$ similar to the right connector $f$. However, a bolt $i$ secured to the left leg portion 24 is threadedly connected to the connector $f′$ at the common end of the bifurcated elements thereof.

The reinforcing body 12 is tensioned longitudinally by the piston $d$ of the right leg portion, and consequently, when the saw-blade S runs, its back shoulder S″ is kept closely in contact with the bottom face 12′ of the reinforcing body 12.

Both of the slots $h$ are vertically elongated to permit adjustment of the reinforcing body 12 so that it can be closely and forcibly pressed against the back shoulder S″ of the band-saw S. The piston mechanism $d$ is coupled to hydraulic pump 22 which is driven by the motor 3.

The reinforcing body 12 accordingly is always actuated to force down the back shoulder S″ of the band-saw S and is arranged and disposed so that the ends 12″ of the reinforcing body 12 are connected to the connectors $f$ and $f′$, below the center $c_0$ of the reinforcing body 12, i.e., in the proximity of the back shoulder S″ of the band-saw S. By the hydraulic pressure force on piston $d$, the reinforcing body 12 is placed in tension through the connection bolts $a$ at its ends 12″. Therefore, the tension forces on the reinforcing body 12 act upon the connected portion of the reinforcing body 12 which are below the center $c_0$ thereof, namely, at the position of the bolts $a$, that is in the proximity of the back shoulder portion S″ of the band-saw S, and consequently the reinforcing body 12 tends to bend downwardly. Accordingly, an escaping and a bending upwardly of the back shoulder S″ of the band-saw blades S′ during a cutting operation is completely prevented so that the band-saw S is maintained straight. Also, since each end 12″ of the reinforcing body 12 is held in position tightly by the fixed element $c$ and the moving element $e$ of the connectors $f$ and $f′$, lateral bending of the reinforcing body 12 is completely prevented and the reinforcing body 12 always maintains and forces down the band-saw S vertically so that the reinforcing body 12 and the band-saw S integrally cut into the work.

As shown in FIG. 4, the reinforcing body 12 is thinner than the width of the saw-teeth set S′ of the saw-blade S, so that the reinforcing body 12 can completely pass through a cutting groove (i.e., the kerf) formed in the cutting process in the work, thereby raising no interference with the cutting operation. Accordingly, with the present invention, relatively narrow and thin band-saws can be utilized to cut wider large section area parts and yet resist bending, distortion and twisting, whereas in the prior art a wider and thicker band-saw was required to be used.

Since the band-saw S of the present invention is sufficiently prevented from bending and twisting, its durability is remarkably increased. The pair of connectors $f$ and $f′$ provided at both ends 12″ of the reinforcing body member 12 remarkably increases the rigidity of the member and prevents lateral and transverse bending. The piston $d$ acts on the connecting member $f$ at a position above the center line $c_0$ of the reinforcing body, and the connection bolts $a$ are connected to the reinforcing body 12, and to the connectors $f$ and $f′$ at a position below the center line $c_0$ of the reinforcing body 12. The piston $d$ exerts the longitudinal tensional force on the reinforcing body 12 through the connector $f$. Vibrations of the saw-body are reduced so that the cutting operation is accomplished perfectly with remarkably increased operating efficiency.

While I have disclosed one embodiment of the present invention, it is to be understood that this embodiment is given by example only and not in a limiting sense, the scope of the present invention being determined by the objects and the claims.

I claim:
1. An apparatus for metal cutting comprising
a band-saw for cutting a workpiece and including a saw-teeth set on one longitudinal edge and a back shoulder on the other longitudinal edge,
an elongated reinforcing body longitudinally abutting said band-saw against said back shoulder of said band-saw, said band-saw and said reinforcing body being made of a strong and ductile metal, said reinforcing body being slightly thinner than the width of said saw-teeth set, and means for holding and for providing a force to said reinforcing body at the ends thereof at a position between the longitudinal center of said reinforcing body and said back shoulder, thereby forcing the back shoulder of said band-saw in a direction toward the saw-teeth set.

2. The apparatus, as set forth in claim 1, wherein said means includes a piston mechanism and a hydraulic pump means for driving said piston mechanism.

3. The apparatus, as set forth in claim 1, wherein said means includes, at least one connector having a common end and two spaced bifurcated elements defining a space therebetween wider than the width of said reinforcing body and between which an end of the latter is disposed, a moving element disposed between said end of said reinforcing body and one of said bifurcated elements, bolt means laterally passing through said one of said bifurcated elements, said moving element, said end of said reinforcing body, respectively, and threadedly secured to the other of said bifurcated elements, said bolt means formed with an enlarged portion abutting said moving element and adapted to be inserted laterally pressing and holding said end of said reinforcing body against said other of said bifurcated elements, said end of said reinforcing body formed with an elongated slot oriented perpendicular to the length of said reinforcing body and through which said bolt means passes, said elongated slot formed between said longitudinal center of said reinforcing body and said back shoulder of said band-saw, and a piston means connected to said common end of said connector for applying a force longitudinally to said reinforcing body.

4. The apparatus, as set forth in claim 3, wherein said force applied to said reinforcing body is tension.

5. The apparatus, as set forth in claim 3, wherein said at least one connector includes two connectors, one connected at each end of said reinforcing body.

References Cited

UNITED STATES PATENTS

| | | | |
|---|---|---|---|
| 308,188 | 11/1884 | Miller | 143—19 |
| 552,614 | 1/1896 | Hutchinson | 143—19 X |
| 1,061,702 | 5/1913 | Taggart | 143—32 |
| 3,352,186 | 11/1967 | Cleland | 83—201.15 |

FRANK T. YOST, Primary Examiner

U.S. Cl. X.R.

83—698; 143—160